United States Patent
Hue et al.

(10) Patent No.: US 10,047,634 B2
(45) Date of Patent: Aug. 14, 2018

(54) ACTUATOR FOR AIRCRAFT TURBINE ENGINE NACELLE WITH NOTABLY ONE-PIECE ANNULAR REAR PART

(71) Applicant: AIRCELLE, Gonfreville l'Orcher (FR)

(72) Inventors: Corentin Hue, Le Havre (FR); Jérôme Corfa, Cresseveuille (FR)

(73) Assignee: AIRCELLE, Gonfreville l'orcher (FR)

( * ) Notice: Subject to any disclaimer, the term of this patent is extended or adjusted under 35 U.S.C. 154(b) by 931 days.

(21) Appl. No.: 14/287,845

(22) Filed: May 27, 2014

(65) Prior Publication Data

US 2014/0271163 A1  Sep. 18, 2014

Related U.S. Application Data

(63) Continuation of application No. PCT/FR2012/052597, filed on Nov. 12, 2012.

(30) Foreign Application Priority Data

Nov. 24, 2011  (FR) ..................................... 11 03589

(51) Int. Cl.
| | |
|---|---|
| *B64D 29/08* | (2006.01) |
| *F01D 25/24* | (2006.01) |
| *B64D 29/06* | (2006.01) |
| *B64D 33/04* | (2006.01) |
| *F02K 1/76* | (2006.01) |

(Continued)

(52) U.S. Cl.
CPC ........... *F01D 25/243* (2013.01); *B64D 29/06* (2013.01); *B64D 29/08* (2013.01); *B64D 33/04* (2013.01); *F02K 1/763* (2013.01); *B64C 13/28* (2013.01); *F05D 2230/80* (2013.01); *F16H 2025/2037* (2013.01); *F16H 2025/2075* (2013.01); *Y02T 50/671* (2013.01)

(58) Field of Classification Search
CPC ....... F01D 25/243; B64D 29/08; B64D 29/06; B64D 33/04; F02K 1/763
See application file for complete search history.

(56) References Cited

U.S. PATENT DOCUMENTS

| | | |
|---|---|---|
| 3,523,599 A | 8/1970 | Denkowski |
| 3,717,304 A | 2/1973 | Sutton |
| | (Continued) | |

FOREIGN PATENT DOCUMENTS

| | | | |
|---|---|---|---|
| FR | 2 088 393 A1 | 1/1972 | |
| FR | 2 911 372 A1 | 7/2008 | |
| | (Continued) | | |

OTHER PUBLICATIONS

International Search Report dated Mar. 5, 2013 in International Application No. PCT/FR2012/052597.

*Primary Examiner* — Woody Lee, Jr.
*Assistant Examiner* — Maxime Adjagbe
(74) *Attorney, Agent, or Firm* — Burris Law, PLLC

(57) ABSTRACT

An actuator for an aircraft turbine engine nacelle with a one-piece annular rear part, includes an engine assembly having a nut which is capable of rotating but not of translational movement, and a shaft for turning this nut. The actuator also includes a screw assembly having a screw capable of translational movement without rotating, in mesh with the nut, and a ball joint at one end of this screw intended to be fixed to the annular rear part.

6 Claims, 3 Drawing Sheets

(51) Int. Cl.
*B64C 13/28* (2006.01)
*F16H 25/20* (2006.01)

(56) References Cited

U.S. PATENT DOCUMENTS

| | | | |
|---|---|---|---|
| 6,935,097 B2 * | 8/2005 | Eschborn | B64D 33/04 |
| | | | 239/265.19 |
| 7,954,756 B2 | 6/2011 | Cavalier et al. | |
| 2010/0096498 A1 | 4/2010 | McKay | |
| 2010/0115958 A1 * | 5/2010 | Parham | F02K 1/09 |
| | | | 60/771 |

FOREIGN PATENT DOCUMENTS

| | | |
|---|---|---|
| FR | 2 914 700 A1 | 10/2008 |
| WO | 86/00862 A1 | 2/1986 |

* cited by examiner

ACTUATOR FOR AIRCRAFT TURBINE ENGINE NACELLE WITH NOTABLY ONE-PIECE ANNULAR REAR PART

CROSS-REFERENCE TO RELATED APPLICATIONS

This application is a continuation of International Application No. PCT/FR2012/052597, filed on Nov. 12, 2012, which claims the benefit of FR 11/03589, filed on Nov. 24, 2011. The disclosures of the above applications are incorporated herein by reference.

FIELD

The present disclosure relates to an actuator for an aircraft turbine engine nacelle with notably one-piece annular rear part.

BACKGROUND

The statements in this section merely provide background information related to the present disclosure and may not constitute prior art.

As is visible on FIG. 1, in certain nacelles for dual-flow turbine engines, the rear part A, defining, with the fairing C of the turbine engine (often designated by "IFS"—or inner fixed structure") the cold flow stream V, is exhibited in the form of a one-piece ferrule: in this case, it is usually called an "O-duct" type nacelle.

In this type of nacelle, the rear part of the nacelle A is slidingly mounted on an uppermost beam S by means of rails R, between the operating position visible on FIG. 1, and a maintenance position visible on FIG. 2, in which the rear part of the nacelle is moved to the rear of the nacelle, thus allowing access to the turbine engine T for maintenance work.

More particularly, once the rear part A has slid towards its downstream position visible on FIG. 2, the IFS C may be opened from the outside of the nacelle, by making the two halves which constitute it swivel around axes substantially parallel with the nacelle.

The sliding movement of the rear part of the nacelle towards its maintenance position may be achieved manually or by means of electrical or hydraulic actuators.

An example of such an actuator of the prior art is represented on FIG. 3.

As is visible on this figure, such an actuator comprises a worm drive 1 on which is screwed a nut 3, itself secured to an actuating tube 5 of which the free end ends by an eyelet or ball joint 7.

Preferably, balls 8 are interposed between the threads of the screw 1 and those of the nut 3, in such a manner as to reduce friction, such that this type of actuator is commonly called "ball screw".

The screw 1 comprises, at the end opposite that of the ball joint 7, a pinion 9 with oblique toothing cooperating with a master pinion 11 itself directly or indirectly driven by an electrical engine.

Under the action of this electrical engine, the screw 1 may be swiveled in one direction or the other, and thus translate the nut 3 in one direction or the other, and hence elongate or retract the tube 5.

These movements of the tube 5 allow, by means of the ball joint 7, to act on the rear part of the nacelle A.

As it may be understood, when such an actuator is in complete extension position, its cantilever is very important, namely substantially equal to twice the length of the screw 1.

Apart from the fact that such a cantilever may generate significant friction, or even, blocking particularly the nut 3 with respect to the screw 1, it requires an important dimensioning of the different pieces (screw 1, nut 3, tube 5) in order to provide sufficient resistance to buckling forces; such a dimensioning leads to excess weight.

SUMMARY

The present disclosure provides an actuator for aircraft turbine engine nacelle with a notably annular one-piece rear part, the actuator comprising:
  an engine assembly comprising a nut which is capable of rotating but not of transitional movement and means for turning this nut, and
  a screw assembly comprising a screw capable of transitional movement without rotating, in mesh with said nut and a ball joint at one end of this screw intended to be fixed to said rear part.

Thanks to these features, the screw, which hence crosses the nut, may be translated by putting the nut in rotation: this screw may hence switch from a position in which the fixing ball joint is practically in contact with the nut, to a position in which it is distant from this nut by a length that is substantially equal to the length of the screw.

Hence, it can be understood from the fact that it provides, when in retracted position, a point of attachment from the rear part of the nacelle closest to the engine assembly, the actuator according to the present disclosure allows substantially reducing by half, with respect to the aforementioned prior art, the cantilever when it is in complete extension position.

In this way, the dimensioning of this actuator may be reduced with a weight gain.

According to other features of the actuator according to the present disclosure:
  said engine assembly comprises a support and a casing able to be fixed on this support and enclose said nut;
  said actuator comprises a protective tube fixed on said support, able to contain said screw when the actuator is in retracted position: this tube allows to protect the screw from particles liable to jam the actuator and limit the vibration movements of the screw.

The present disclosure also relates to an aircraft turbine engine nacelle with a rear annular one-piece part, comprising a plurality of actuators in accordance with what precedes, disposed between a stationary part of this nacelle and said rear part of the nacelle.

According to other features, this nacelle comprises an uppermost beam and said rear part of the nacelle is slidingly mounted on rails disposed on either side of the beam, an actuator in accordance with what precedes being mounted on each side of this beam, in the vicinity of said rails: in such a nacelle, due to the characteristic of the rear part, two actuators may be sufficient; the fact of providing that they are at the vicinity of the rails makes it possible to reduce the tipping movements imparted by these actuators on the rear part of the nacelle during its opening, and hence the jamming risks;

The present disclosure also relates to a propulsion assembly, comprising a nacelle in accordance with what precedes, and a turbine engine placed inside this nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
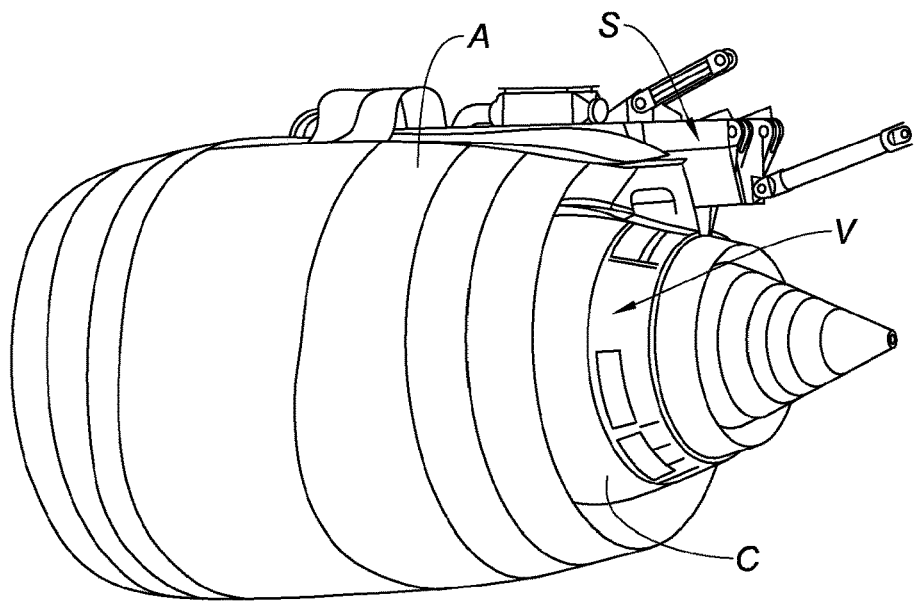
FIG. 1 is a view of a nacelle of "O-Duct" type of the prior art, such as described in preamble of the present description, in normal operating configuration.
Figure 2:
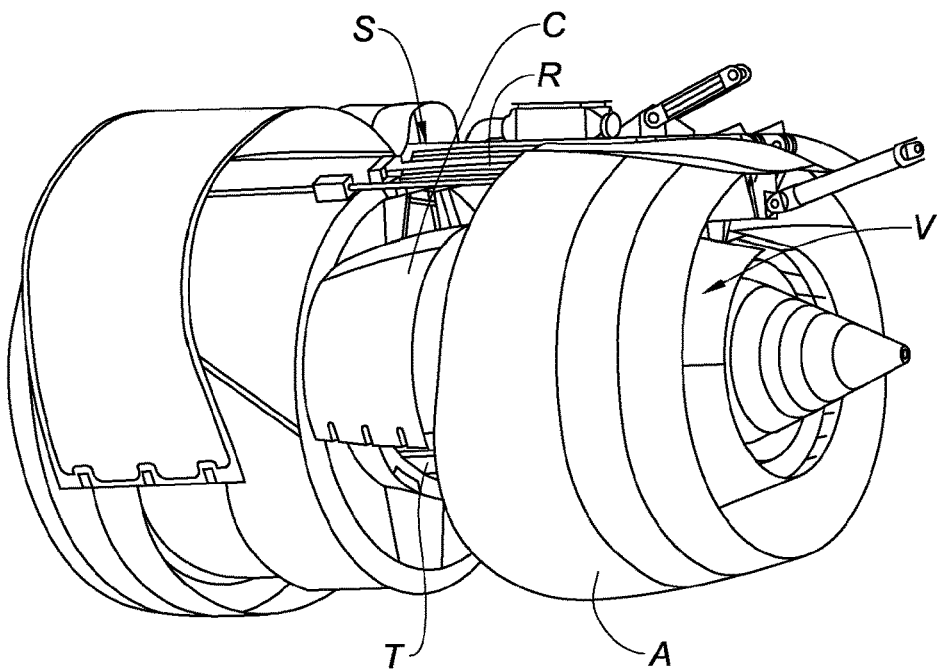
FIG. 2 is a view of this nacelle in maintenance configuration.
Figure 3:
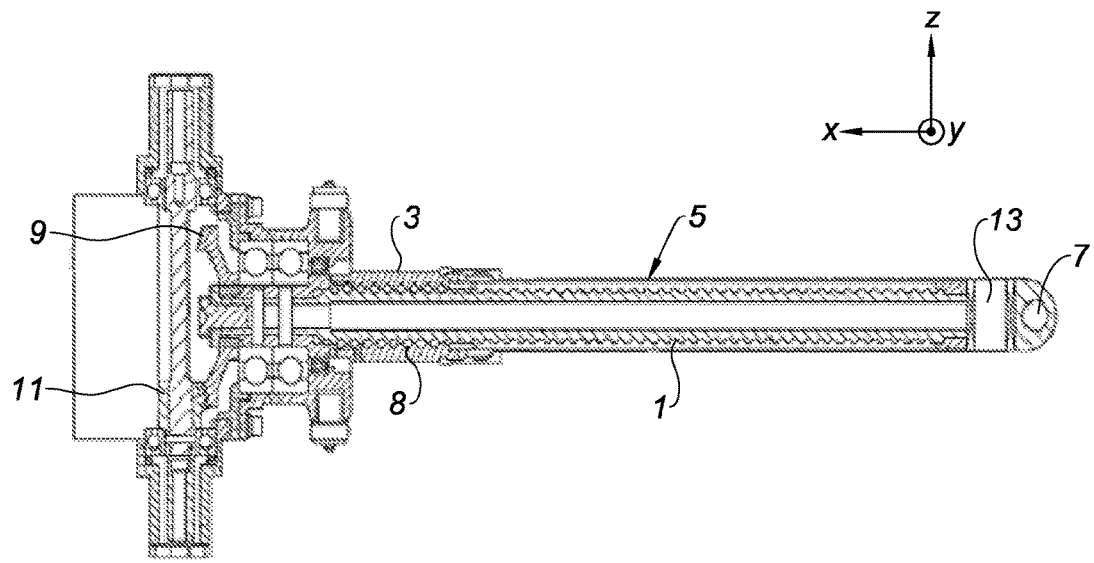
FIG. 3 is an axial cross-sectional view of an actuator of the prior art, mentioned in the preamble of the present description.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It has furthermore been represented on this set of figures a frame of reference X, Y, Z, of which axes X and Z are respectively parallel with the axis A of the nacelle and to the vertical, and axis Y is perpendicular to the two other axes.

Figure 4:
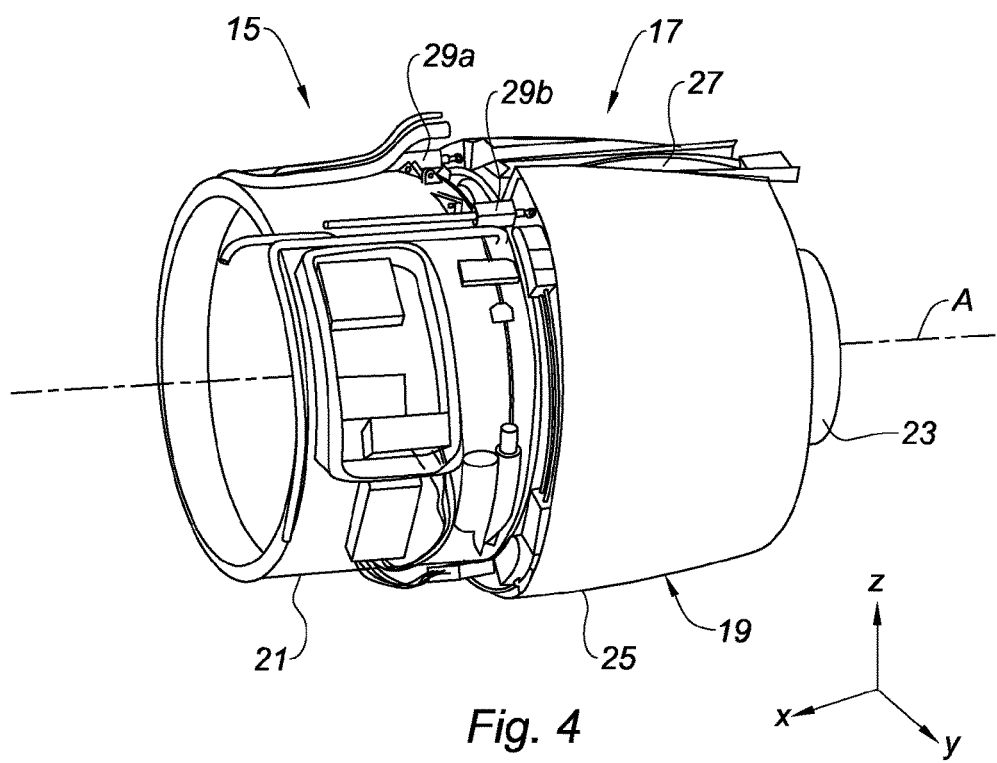
FIGS. 4 and 5 are perspective views of a propulsion assembly comprising a nacelle according to the present disclosure, comprising a rear part represented respectively in normal and maintenance operating positions.
Figure 5:
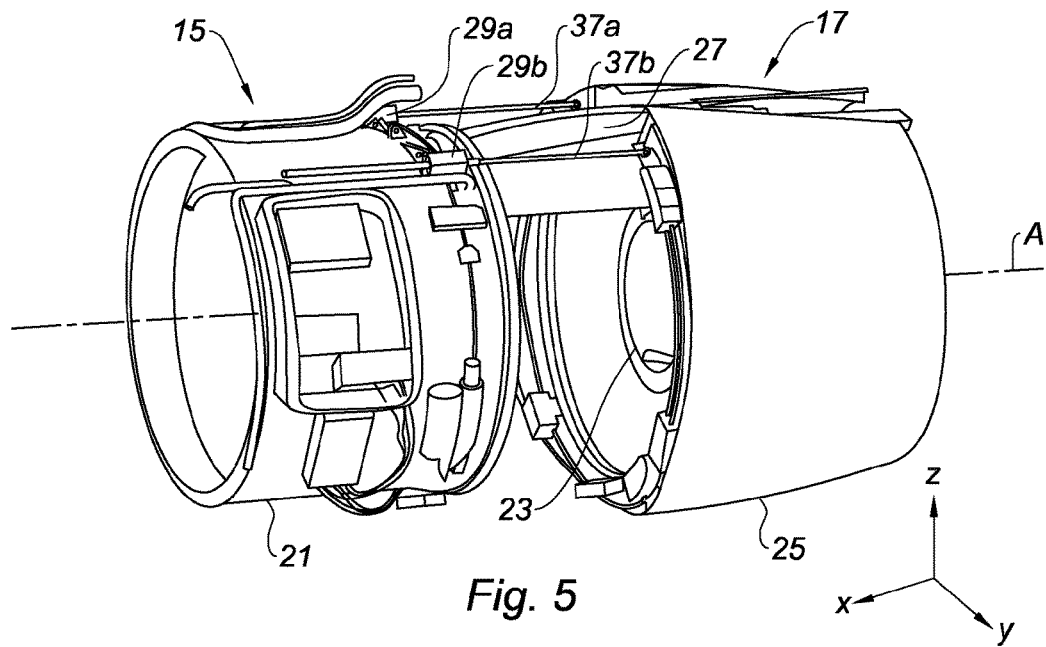

It is worth noting that in the present patent application, the terms "upstream" and "downstream" must be understood with respect to the circulation of the air flow inside the propulsion assembly formed by the nacelle and the turbine engine, that is to say from the left to the right of FIGS. 4 and 5.

It is now referred to FIGS. 4 and 5, on which can be seen an aircraft propulsion assembly, comprising on the one hand a turbine engine 15 and on the other hand a nacelle 17 enveloping this turbine engine.

On FIGS. 4 and 5, solely the rear part A of the nacelle is represented, but obviously, it is to be understood that the nacelle is designed to act as a fairing around the entire turbine engine 15.

The turbine engine 15 comprises in particular, an upstream part 21 forming a fan casing, and a downstream part 23 forming the actual engine, in which are achieved the compression, combustion and gas ejection making the aircraft propulsion possible.

The rear part of the nacelle 25 may incorporate a thrust reversal function, for example of grid type. The rear part of the nacelle 25 is slidingly mounted between a normal operating position represented on FIG. 4, and a maintenance position represented on FIG. 5, allowing to perform maintenance work on the ground: in this position, an operator may in particular, access the engine 23.

The rear part of the nacelle 25 is a one-piece, that is to say, which is formed of one single piece, and is slidingly mounted by means of rails on an uppermost beam 27.

As indicated in the preamble of the present description, it is frequently talked of "O-Duct" type thrust reversers, as opposed to "D-Duct" type grid thrust reversers, in which there are two rear half-parts each slidingly mounted on an upper beam and a lower beam.

The uppermost beam 27 allows in particular, the fixing of the propulsion assembly to a suspension pylon, disposed under the wing of an aircraft.

As can be seen on FIGS. 4 and 5, two actuators 29a and 29b are disposed on either side of the uppermost beam 27, each interposed between the fan casing 21 and the rear part of the nacelle 25.

It is worth noting that the fact of positioning the two actuators 29a and 29b in the vicinity of the uppermost beam 27 allows limiting the tipping movements imposed by the actuators to the rear part of the nacelle 25, and thus reducing jamming risks of this rear part while sliding.

Figure 6:
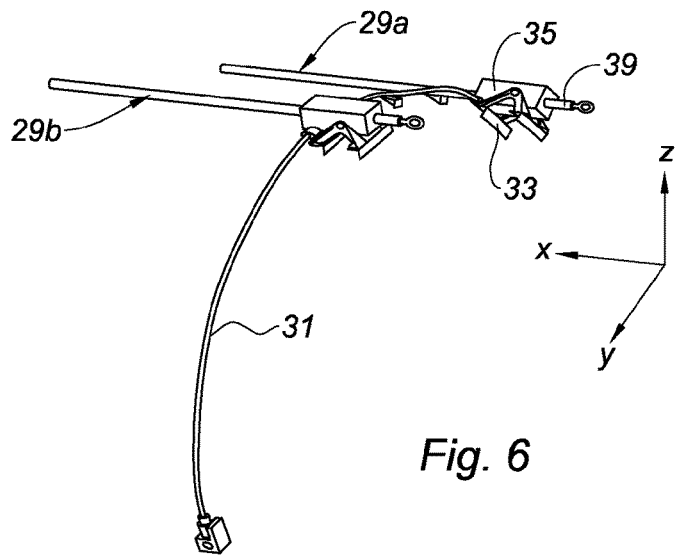
FIG. 6 is a perspective view of the actuating system of the rear part of the nacelle of FIGS. 4 and 5.

By referring to FIG. 6, it can be seen the two actuators according to the present disclosure 29a and 29b are moved by a flexible rotating shaft 31, itself actuated by an electrical or hydraulic engine: this type of flexible shaft is often designated by "flexshaft", by technicians in the field.

Figure 7:
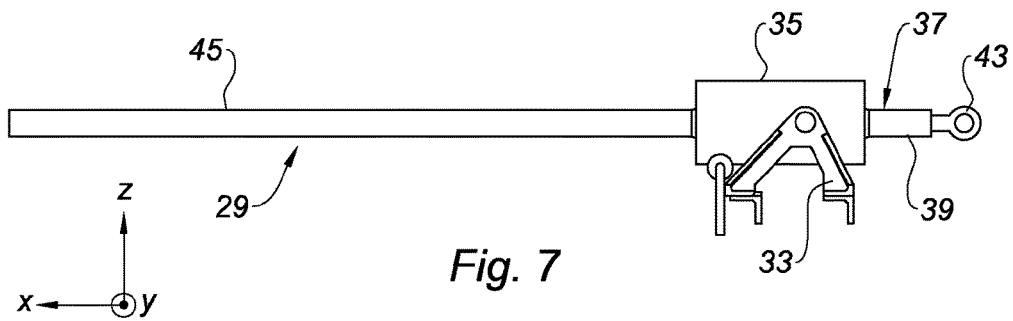
FIG. 7 is a side view of one of the actuators of the actuating system of FIG. 6.

Now, by referring, in particular, to FIG. 7, it can be seen that each actuator 29 comprises a support 33 on which a casing 35 is fixed.

Inside this casing 35 is a nut (not represented), liable to turn around the axis of the actuator 29, as a result of the rotation of the flexible shaft 31.

Hence, this nut is rotatably mounted inside the casing 35, but is immovable in translation, as opposed to the actuator of the prior art.

The actuator 29 further comprises a worm drive 37 (37a, 37b on FIG. 5) engaged with the nut which is inside the casing 35, comprising at its free end a ball joint 43 intended to be fixed on the rear part of the nacelle 25.

Opposite the ball joint 43, the actuator according to the present disclosure comprises a protective tube 45 fixed on the support 33, able to accommodate the entire length of the worm drive 39.

The operating mode and advantages of the actuator according to the present disclosure directly result from the preceding description.

When the nacelle is closed (FIG. 4), the worm drive 39 is retracted, that is to say that it occupies the whole internal volume of the protective tube 45: in this position, the ball joint 43 is nearest to the support 33 as represented on FIG. 7.

Thanks to this proximity, the actuator according to the present disclosure may be practically fixed on the upstream edge of the rear part of the nacelle 25, thus interfering as least as can be with the structure thereof: thus the interference of the actuator is limited, particularly with the regions of this rear part of the nacelle which are encumbered by other members.

The protective tube 45 allows to protect the worm drive 39 of the actuator, as well as limit its the vibrations when it is in the retracted position represented on FIG. 5.

When it is required to make the rear part of the nacelle 25 slide towards its maintenance position represented on FIG. 5, the nut which is inside the casing 35 is turned, by means of the flexible shaft 31: this rotation provides an extension of the worm shaft 39, that is to say a displacement of this screw to the right of FIG. 5.

The ball joint 43 thus, drives the rear part of the nacelle 25 towards its downstream position, given that in the maximum extension position represented in FIG. 5, the distance separating the support 33 from the point of attachment of the worm drive 39 to the rear part of the nacelle 25, is at the most equal to the length of this screw, and not to twice the length of this screw, as opposed to the actuator of the prior art.

In this manner, the cantilever of the actuator may be substantially diminished when it is in complete extension position, and as a result reduce the dimensioning of the different pieces constituting this actuator, allowing in fine, a weight gain.

Obviously, when it is sought to bring the rear part of the nacelle 25 from its downstream position represented on FIG. 5 to its closed position (FIG. 4), the nut which is inside the casing 35 is turned in the opposite direction, allowing the retraction of the worm drive 39 inside the protective tube 45.

Obviously, the present disclosure is in no way limited to the described and represented forms, provided by way of mere examples.

What is claimed is:

1. An actuator for an aircraft turbine engine nacelle with a one-piece annular rear part, said actuator disposed between a stationary part of said engine nacelle and said annular rear part of the engine nacelle, said actuator comprising:
   an engine assembly comprising a nut which rotates, without translational movements along a longitudinal axis of said engine nacelle, and means for turning said nut; and
   a screw assembly comprising a screw translating, without rotating, along the longitudinal axis, in mesh with said nut and a ball joint at one end of said screw fixed to said annular rear part,
   wherein the screw assembly extends essentially upstream the nut when the actuator is in a retracted position, and
   wherein the screw is configured to switch between a first position in which the ball joint is practically in contact with the nut, and a second position in which the ball joint is distant from the nut by a length that is substantially equal to the length of the screw.

2. The actuator according to claim 1, wherein said engine assembly comprises a support and a casing fixed on said support and enclosing said nut.

3. The actuator according to claim 2, further comprising a protective tube fixed on said support, said protective tube containing said screw when the actuator is in a retracted position.

4. An aircraft turbine engine nacelle with a one-piece annular rear part, said engine nacelle comprising a plurality of actuators according to claim 1, wherein said engine nacelle comprises an uppermost beam, and said annular rear part of the engine nacelle is slidingly mounted on rails disposed on either side of the uppermost beam.

5. The aircraft turbine engine nacelle according to claim 4, wherein said actuators are mounted on each side of the uppermost beam, in the vicinity of said rails.

6. A propulsion assembly, comprising the aircraft turbine engine nacelle according to claim 4 and a turbine engine placed inside said engine nacelle.

* * * * *